(12) United States Patent
Katic

(10) Patent No.: US 8,019,029 B1
(45) Date of Patent: Sep. 13, 2011

(54) INTERFERENCE ERASURE USING SOFT DECISION WEIGHTING OF THE VITERBI DECODER INPUT IN OFDM SYSTEMS

(75) Inventor: Ognjen Katic, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 793 days.

(21) Appl. No.: 12/062,392

(22) Filed: Apr. 3, 2008

Related U.S. Application Data

(60) Provisional application No. 60/946,290, filed on Jun. 26, 2007.

(51) Int. Cl.
- H03D 1/04 (2006.01)
- H03D 1/06 (2006.01)
- H03K 5/01 (2006.01)
- H03K 6/04 (2006.01)
- H04B 1/10 (2006.01)
- H04L 1/00 (2006.01)
- H04L 25/08 (2006.01)

(52) U.S. Cl. .................. 375/346; 375/285; 370/206

(58) Field of Classification Search .............. 375/229, 375/259–260, 267, 285, 316, 340, 346–347, 375/349–350; 370/203, 206, 210
See application file for complete search history.

(56) References Cited

U.S. PATENT DOCUMENTS

| | | | |
|---|---|---|---|
| 6,304,594 B1 | 10/2001 | Salinger | |
| 6,442,130 B1 * | 8/2002 | Jones et al. | 370/208 |
| 6,512,737 B1 * | 1/2003 | Agee | 370/208 |
| 6,757,241 B1 * | 6/2004 | Jones et al. | 370/208 |
| 6,807,405 B1 | 10/2004 | Jagger et al. | |
| 6,990,059 B1 | 1/2006 | Anikhindi et al. | |
| 6,999,501 B1 | 2/2006 | Sawyer | |
| 7,012,978 B2 | 3/2006 | Talwar | |
| 7,016,298 B2 * | 3/2006 | Akiyama et al. | 370/206 |
| 7,095,791 B2 | 8/2006 | Jones, IV et al. | |
| 7,149,238 B2 | 12/2006 | Agee et al. | |
| 7,197,291 B2 | 3/2007 | Mach et al. | |
| 7,453,966 B2 * | 11/2008 | Tang et al. | 375/348 |
| 7,826,517 B2 * | 11/2010 | Kim et al. | 375/148 |
| 7,852,951 B2 * | 12/2010 | Kalluri et al. | 375/260 |
| 2005/0059366 A1 * | 3/2005 | Choi et al. | 455/130 |
| 2006/0002361 A1 * | 1/2006 | Webster et al. | 370/343 |
| 2006/0135083 A1 * | 6/2006 | Leinonen et al. | 455/78 |
| 2007/0025454 A1 * | 2/2007 | Jones et al. | 375/260 |
| 2007/0183522 A1 * | 8/2007 | Garrett et al. | 375/260 |
| 2008/0143580 A1 * | 6/2008 | Glazko et al. | 342/17 |
| 2009/0175366 A1 * | 7/2009 | Maltsev et al. | 375/260 |

OTHER PUBLICATIONS

John Terry and Juha Heiskala; OFDM Wireless LANs: A Theoretical and Practical Guide; pp. 113-116; Sams Publishing; 2002.

Sklar, Bernard; Digital Communications; Second Edition; pp. 398; Prentice Hall, 2001.

(Continued)

*Primary Examiner* — Jean B Corrielus

(74) *Attorney, Agent, or Firm* — Knobbe Martens Olson & Bear LLP

(57) ABSTRACT

Disclosed is a technique for mitigating the effect of an in-band interferer in Orthogonal Frequency Division Multiplexing (OFDM) wireless or wired networks that employ soft decision Viterbi decoder in the physical layer. The technique uses an independent estimation of the signal quality, which is passed to the Viterbi algorithm decoder so that it is able to discard the corrupted subcarriers. This improves the error correction capability of the Viterbi algorithm decoder in a receiver, which leads to fewer retransmissions and into higher information throughput.

20 Claims, 12 Drawing Sheets

OTHER PUBLICATIONS

Tang, et al.; Space-Time Interference Cancellation in MIMO-OFDM Systems; IEEE Transactions on Vehicular Technology.; vol. 54, No. 5; pp. 1802-1816; The Institute of Electrical and Electronics Engineers, Sep. 2005.

* cited by examiner

INTERFERENCE ERASURE USING SOFT DECISION WEIGHTING OF THE VITERBI DECODER INPUT IN OFDM SYSTEMS

CROSS-REFERENCE TO RELATED APPLICATION

This application claims the benefit under 35 U.S.C. §119 (e) of U.S. Provisional Application No. 60/946,290, filed Jun. 26, 2007, the entirety of which is hereby incorporated by reference.

BACKGROUND

1. Field of the Invention

This invention relates to communication systems and more particularly to orthogonal frequency division multiplexing (OFDM) communication systems. These systems can include wireless or wired systems.

2. Description of the Related Art

Orthogonal frequency division multiplexing (OFDM) is a digital multi-carrier modulation technique that uses a large number of orthogonal subcarriers for combating the effects of intersymbol interference (ISI), and achieves high data rates. In wireless communication systems, ISI is mostly a consequence of multipath fading. Multipath fading results from signal propagation over different reflective paths between a transmitter and receiver. In a deteriorating form, it introduces frequency selectivity in the band of interest and hence inhibits the usage of higher data rates.

Different types of wireless local area networks (wireless LAN), known as Wi-Fi and standardized by various IEEE 802.11 committees, are examples of networks that can employ OFDM techniques in the physical layer of the network architecture.

A network compliant with the advanced IEEE 802.11n standard uses multiple-input-multiple-output (MIMO) techniques to further increase the achievable data rates and reliability. That network can operate in 2.4 and 5 GHz unlicensed bands. Network equipment that operates in 2.4 GHz band is particularly susceptible to various interference sources such as microwave ovens, cordless telephones, Bluetooth devices and other appliances using the same band.

In wireless LAN networks, information is usually transmitted in packets. At the physical layer, those packets are pre-pended with a preamble so that the receiver is able to detect transmission of valid OFDM signal. Furthermore, sharing of the medium is controlled by the network layer called medium access control (MAC). A popular MAC protocol is a carrier-sense-multiple-access with collision avoidance (CSMA/CA) used in IEEE 802.11 applications. MAC defines Inter Frame Spacing during which a receiver should not see any signal energy if there is no external interferences present. OFDM is also used in wired networks, such as in digital subscriber line (DSL) networks and power line networks, which can be subject to interference.

FIG. 1 illustrates a simple IEEE 802.11n LAN that has 3 client stations 102 and a wireless access point 104. The interference source in the illustrated example is a cordless phone 106.

If an interferer (interference source) transmits its signal in the wireless LAN band, it can significantly slow down the network information throughput. Hence, there is a need for methods that can diminish the interference problem.

The presence of an external interferer can be easily detected during time slots when there should not be any signal energy in the medium.

FIG. 2 is a block diagram of a typical transmitter chain used in a multiple-input and multiple-output (MIMO) wireless LAN network such as the one presented in FIG. 1.

Information bits coming from the data source 202 are passed through a scrambler (SCR) 204 and forward error correction (FEC) 206. Many OFDM wireless systems use convolutional coding for FEC 206 at the transmitter and Viterbi algorithm (VA) decoder at the receiver. Besides convolutional coding, other types of error correction such as turbo-codes and block codes can be used.

After the FEC encoding, the data stream is divided into $N_{ss}$ spatial streams (SS) by a spatial parser 208 if spatial multiplexing is used. Next are interleaving 210 and modulation 212, which are followed by a block 214 that performs any of the desired MIMO techniques like beam-forming (BF), space time block coding (STBC) or diversity combining (DIV). The output of this block are $N_{tx}$ transmit streams, that are converted to time domain by inverse Fourier transform, such as by inverse fast Fourier transform (IFFT) 216. Then, a cyclic prefix (CP) 218 is added to the symbols and finally they are passed to the radio frequency (RF) blocks 220 and antennas.

While the transmitter of FIG. 2 has $N_{ss}=N_{tx}=2$, in general, those two numbers can be different as long as $N_{ss}<=N_{tx}$, depending on the MIMO technique that is to be applied. Furthermore, both $N_{ss}$ and $N_{tx}$ can take any positive integer value. $N_{tx}=1$ reduces to a single stream case.

The diagram of FIG. 2 shows just the basic blocks of the typical transmitter. It is well known to those skilled in the art that transmitter operation also includes: generation of preamble, generation of pilot symbols used for channel estimation and other receiver functions, etc. However, those details are not essential for the description of the current invention.

The inverse operations are done in the receiver and are illustrated in FIG. 3. The signals received at the antennas are passed through RF blocks 302 and cyclic prefix removal 304. The RF blocks 302 can correspond to a receiver front-end. The RF blocks 302 may generate baseband signals or intermediate frequency (IF) signals as outputs, which are passed to the next stage for processing. They are converted from time to frequency domain by the corresponding Fourier transform blocks, such as fast Fourier transform (FFT) blocks 306 and passed to an equalizer block 308. Equalizer block 308 includes channel estimation, frequency offset compensation with timing phase tracking, equalizer adaptation and equalization. The outputs of the equalizer block 308 are the compensated received streams and estimates of the quality of those streams.

The receive equalizer can be a linear minimum-mean square error (L-MMSE) equalizer, while the signal quality estimation is based on signal-to-interference-plus-noise ratio (SINR) for each subcarrier. Noise on each subcarrier generally comes from co-channel interference, inter-carrier interference (ICI), inter symbol interference (ISI) and thermal noise and other sources of noise and interference, which is included in signal to interference plus noise ratio (SINR) computation.

Usually, SINR includes the calculation of the subcarrier signal magnitude which is obtained from the channel estimate during the preamble. A strong interference signal during the preamble can produce a high magnitude, while the signal quality is poor. In other words, the reliability of the output SINR is dependent on the reliability of the corresponding subcarrier channel estimate, so interference during the preamble channel estimation portion of the packet can impair subsequent receiver performance, even if the interferer is no longer present. Other types of signal quality estimation may be used alternatively to SINR.

The equalized signal is passed to the soft demodulator block 310. Soft demodulation is preferred because soft decision Viterbi algorithm decoding with 8-bit quantization produces 2 dB of coding gain in Gaussian channel when compared to hard decision Viterbi algorithm decoding (see, for example, Sklar, Bernard, 'Digital Communications', Second Edition, Prentice Hall, 2001, p. 398). Furthermore, in contrast to hard decision, soft decisions can be weighted (W) with the signal quality estimation passed from the equalizer, which is good for the system performance in fading channels. Depending on the channel characteristics, weighted soft decision Viterbi algorithm decoding can significantly improve system performance in comparison to hard decision Viterbi algorithm decoding (see, for example, Heiskala, Juha and John Terry, 'OFDM Wireless LANs: A Theoretical and Practical Guide', Sams Publishing, 2002, pp. 113-116).

The weighting operation is done in the weighting block W 312 of FIG. 3. Next, the weighted soft decision signal is passed to deinterleaver block 314, deparsing blocks 316, Viterbi algorithm (VA) decoder 318 and finally to a descrambler 320.

One approach to mitigating interference is to increase the redundancy of forward error correction (FEC) that is used in the system. The more redundancy added, the greater the tolerance to interference and other noise effects. The disadvantage of this approach is that the capacity used to incorporate more redundancy is taken from payload data capacity. Furthermore, if the wireless LAN is to comply with a particular standard, the designer may not have the liberty to modify the selected coding scheme.

Another approach in handling interference is to do dynamic signal-to-noise ratio (SNR) measurements in order to identify degraded segments of the channel. See, for example, U.S. Pat. No. 6,990,059 to Anikhindi, et al. The degraded segments are then no longer used for transmitting payload data. Although this approach reduces the number of retransmissions in the system, a drawback is that it reduces information throughput.

Yet another approach is to dynamically select between two sets of L-MMSE equalizer taps depending on whether the received signal is dominated by noise or interference. See, for example, U.S. Pat. No. 7,012,978 to Talwar. This solution improves performance of L-MMSE equalizer, but does not completely eliminate presence of a strong interference signal in the Viterbi algorithm decoder processing.

Other methods that rely on estimating interference signal and subtracting it from the main signal path are possible. See, for example U.S. Pat. No. 6,999,501 by Sawyer. However, these methods may require some advanced knowledge about the type or statistics of the interfering signal.

There is a possibility of detecting and avoiding the interference by retuning the transmitter. See for example, U.S. Pat. No. 6,304,594 to Salinger. However, this approach could introduce significant delays in some cases or may be prohibited.

Some methods use statistical characterization of interference as received via the multiple channel outputs. See, for example, U.S. Pat. No. 6,757,241 to Jones, et al. Other methods use refined spatial statistical characterization starting from the initial estimate based on training symbols received via each antenna. See, for example, U.S. Pat. No. 7,095,791 to Jones, IV, et al. This statistical characterization may be computationally demanding.

It would be desirable to have a simple low-cost solution to improving the performance of wireless communication systems in the presence of interference.

SUMMARY OF THE DISCLOSURE

Disclosed is a technique for mitigating the effect of an in-band interferer in Orthogonal Frequency Division Multiplexing (OFDM) wireless or wired networks that employ soft decision Viterbi decoder in the physical layer. In one embodiment, corrupted subcarriers are identified, and rather than being excluded by the transmitter, are nulled by the receiver. The nulling associates the subcarrier with a relatively low signal-to-interference-plus-noise ratio (SINR). During Viterbi algorithm branch metric calculations, the Viterbi algorithm decoder will reduce the weighting of symbols that are affected by interference, which improves its decoding performance. This improves the error correction capability of the Viterbi algorithm decoder in a receiver, which leads to fewer retransmissions and into higher information throughput.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art.

An embodiment of the invention can be used in any OFDM based system that employs a soft decision Viterbi decoder and includes some independent estimation of the signal quality passed to the decoder. Typically, this is required in wireless LAN networks that are susceptible to interference from various appliances and other sources.

The disclosed technique offers a low-cost solution to the problem of narrowband interference. It allows a significant reduction of retransmissions and hence improvement of information throughput in wireless networks that employ OFDM technology.

While described in the context of wireless communications, the principles and advantages described herein are also applicable to any communication system that employs similar OFDM technologies and deals with the interference problem.

Figure 4:
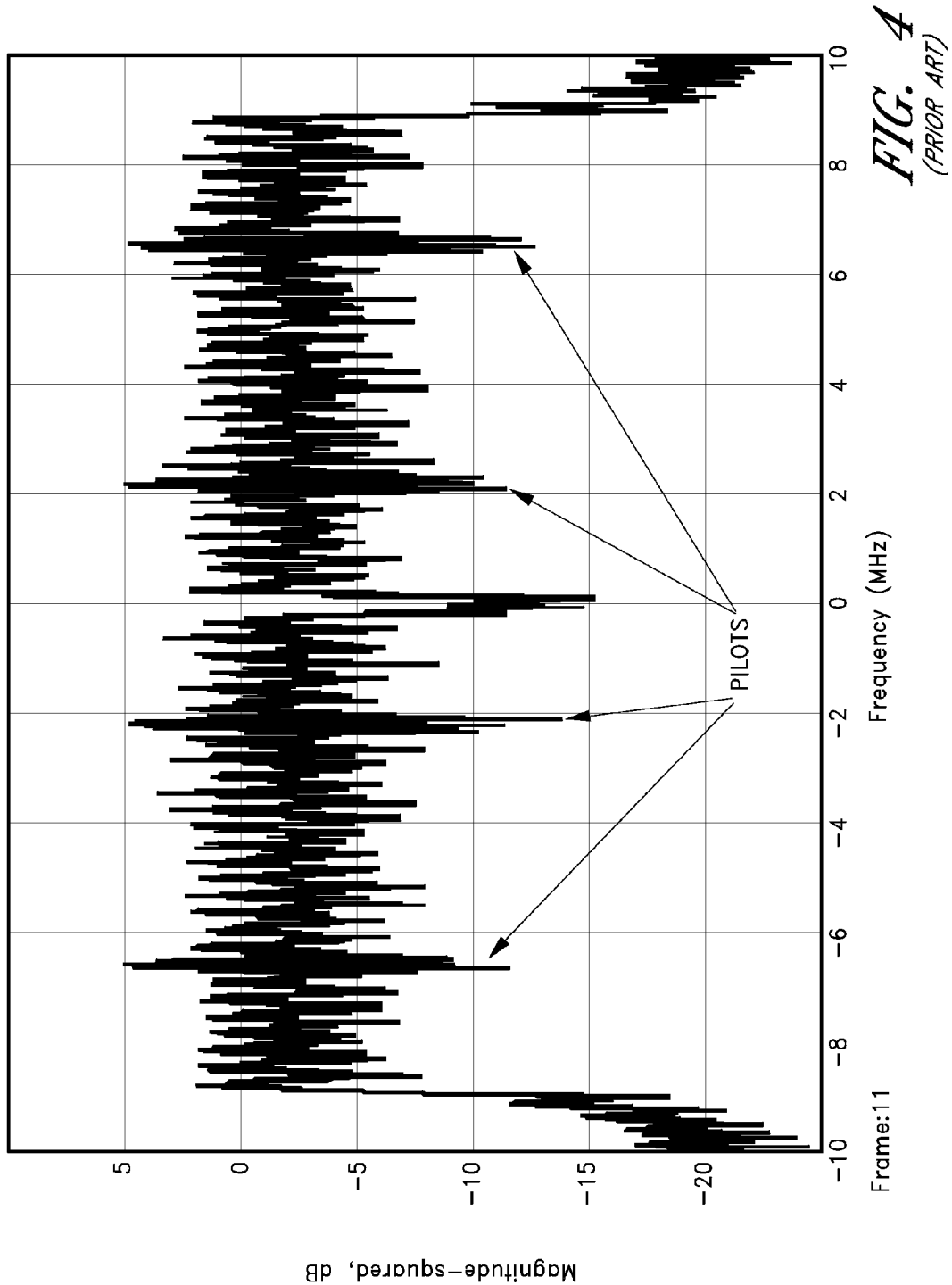
FIG. 4 is a simulation of a signal spectrum under ideal no-fading conditions.

When an OFDM signal is transmitted through an additive white Gaussian noise (AWGN) channel that has a sufficiently high SNR, there will be a negligible rate of errors in the system. FIG. 4 is a simulation of a signal spectrum under such ideal no-fading conditions.

The signal of the simulation of FIG. 4 is an "IEEE 802.11n like" signal in 20 MHz band with 56 subcarriers. Four carriers are pilots, while the rest of the 52 are data carriers. Each data carrier is modulated with 64-QAM signal. The coding rate is ⅔. This means that the bit-rate per SS is 52 Mbit/s. A standard packet length of 1000 octets is used, and the SNR per subcarrier is 30 dB.

In the simulation of FIG. 4, the pilot symbols were deliberately modified from the ones defined by the IEEE standard so that they can be easily noticed in the spectrum.

When this signal is decoded in a receiver, there should be no bit errors because the channel conditions are very good.

Figure 1:
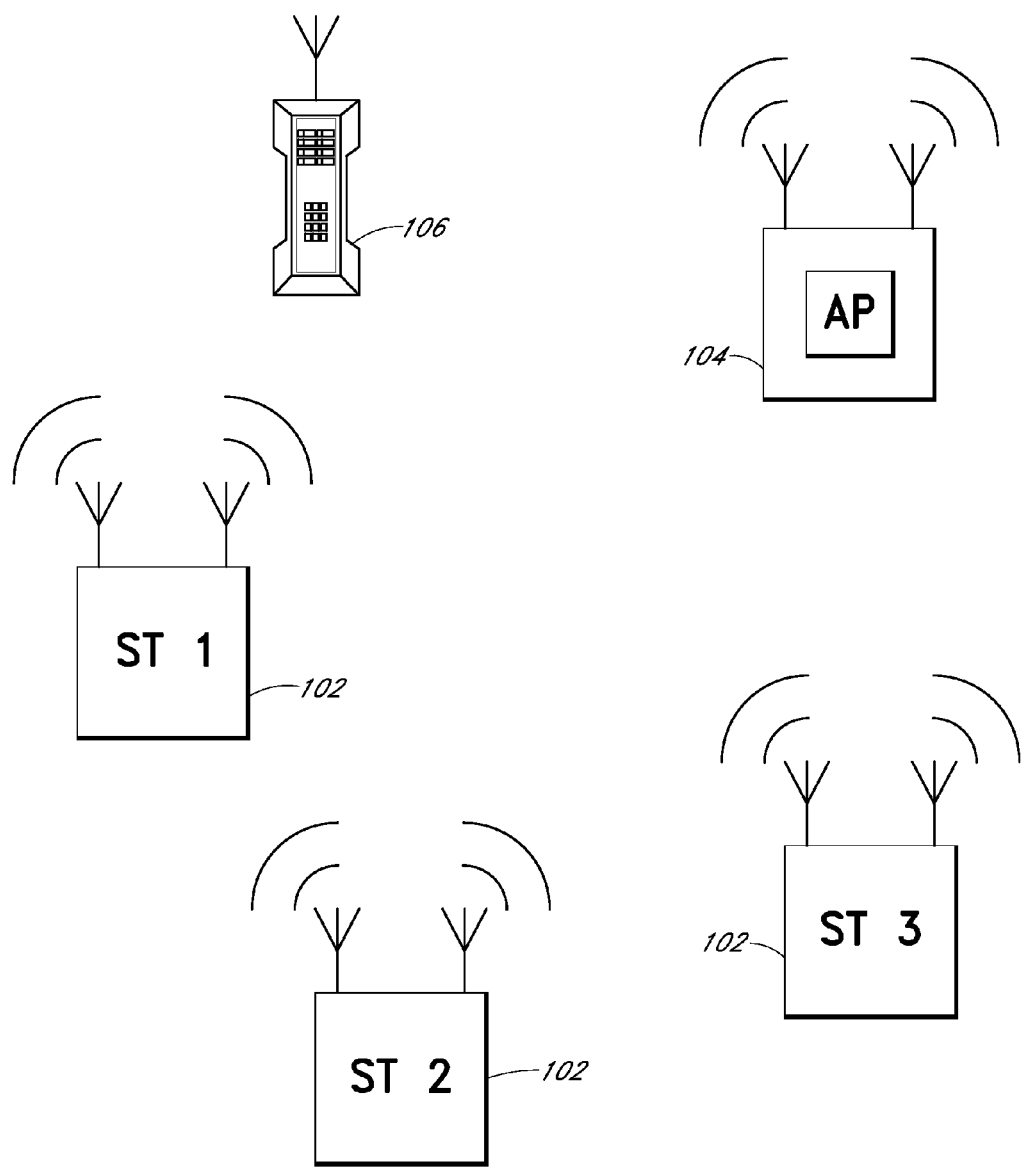
FIG. 1 illustrates an example of a wireless network and an interference source (interferer).
Figure 2:
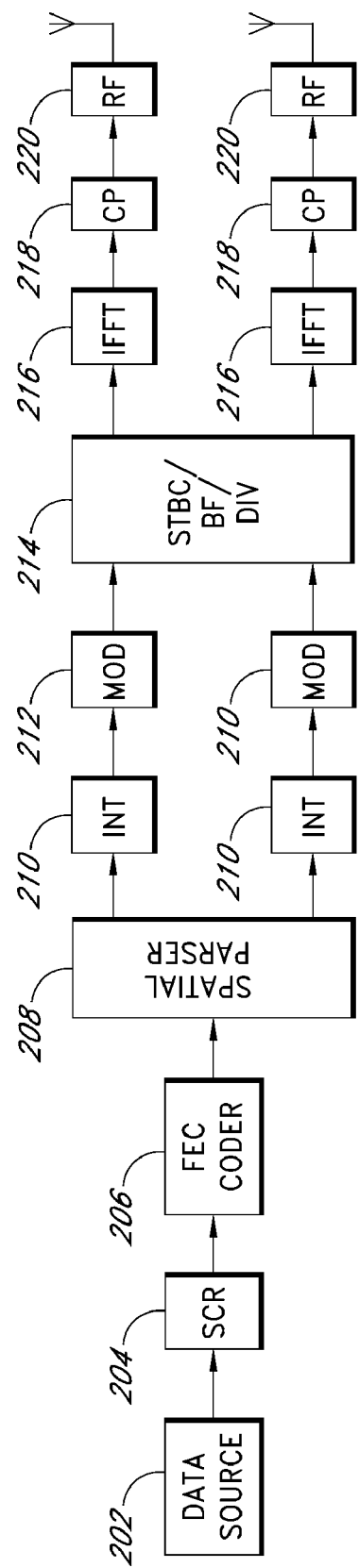
FIG. 2 is a block diagram of a conventional transmitter chain used in a multiple-input and multiple-output (MIMO) wireless LAN network.

However, when only one subcarrier is obstructed by a strong interferer like the analog cordless phone (see FIG. 1), the bit error rate (BER) and consequently packet error rate (PER) becomes significant. As a result, the data rate has to be lowered and packet re-transmission will occur, thus reducing the information throughput in the network.

Figure 3:
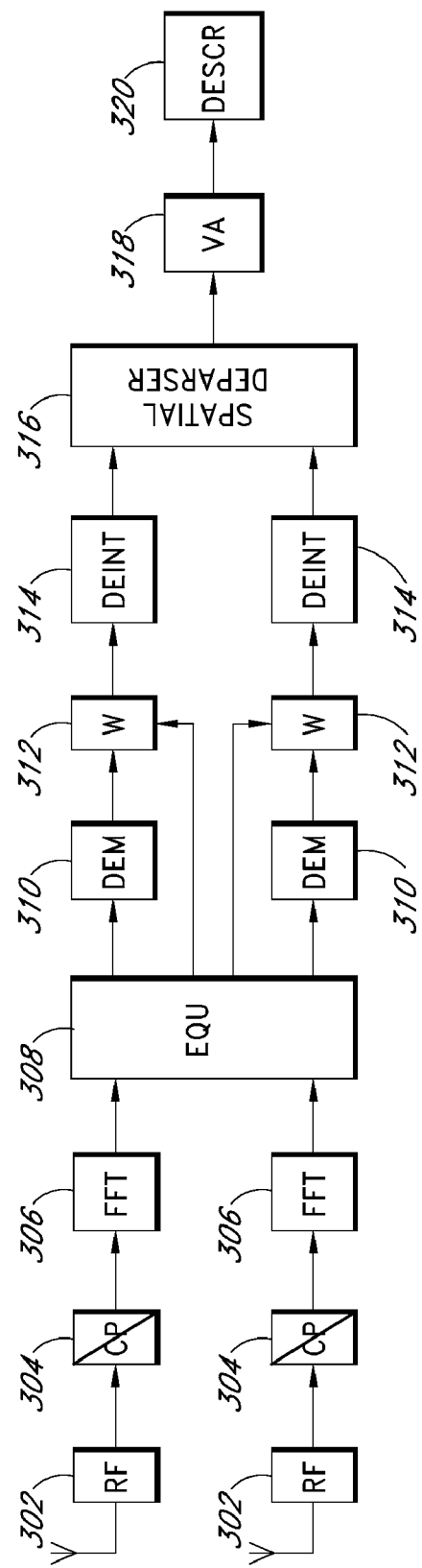
FIG. 3 is a block diagram of a conventional receiver chain used in a MIMO wireless LAN.
Figure 5:
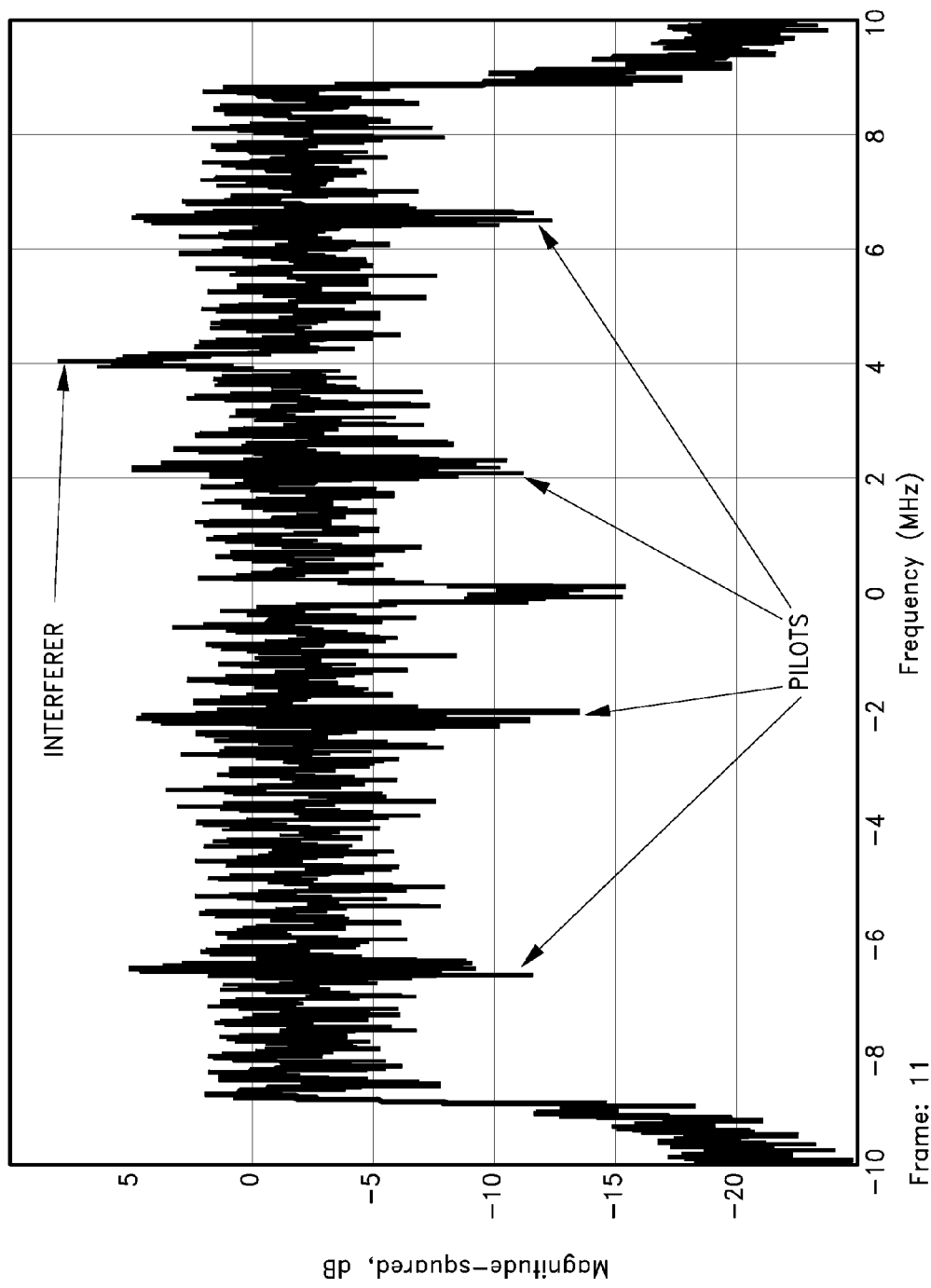
FIG. 5 illustrates the simulation of the signal spectrum with one subcarrier obstructed by interference.

FIG. 5 illustrates the signal spectrum with one subcarrier obstructed by interference. In the illustrated example, as the interferer is strong, the signal-to-noise ratio (SNR) on the interfered subcarrier is typically very poor. However, the equalizer 308 (FIG. 3) is typically not able to properly detect this significant reduction in SINR because it observes considerable energy on the corresponding carrier. This translates to improper signal quality estimation which can incorrectly weight the output of the soft demodulator. In addition, this unreliable symbol will enter the Viterbi algorithm (VA) decoder and cause errors. So, a method for preventing the described scenario is used.

Use of the SINR for weighting the soft decision demodulator output prior to passing it to the Viterbi algorithm decoder is a powerful method for improving system performance in fading channel environments. This approach is very efficient because it marks data bits of severely faded subcarrier as unreliable. Then, the Viterbi algorithm decoder is able to discard information from those unreliable bits while computing the branch metrics and thereby improve its decoding performance.

If only one subcarrier of the received signal is obstructed by a strong interferer, it can distort SINR computation in such a way that the estimated signal quality on a corrupted subcarrier is wrong. The resultant incorrect weighting of soft decision streams can introduce unreliable bits, distorted by the interference signal, into the Viterbi algorithm decoder branch metric computation.

In the prior art, the subcarrier exclusion was used when corrupted subcarriers were detected, and then information was not transmitted on those subcarriers. As a result, the subcarrier exclusion technique loses throughput. Subcarrier exclusion is a transmitter function. In the prior art, the soft decision weighting of a Viterbi algorithm decoder input is a technique used only to deal with fading.

One embodiment of the invention extends the application of soft decision weighting to mitigate the effects of external interference by modifying the soft decision based on the interference and thus improve the quality of the Viterbi algorithm decoder branch metric computation. In one embodiment, this modification is performed by making the received signal look like an appropriately faded signal. For example, the corrupted subcarrier can be nulled or attenuated from each spatial stream. Nulling is a receiver function.

Figure 6:
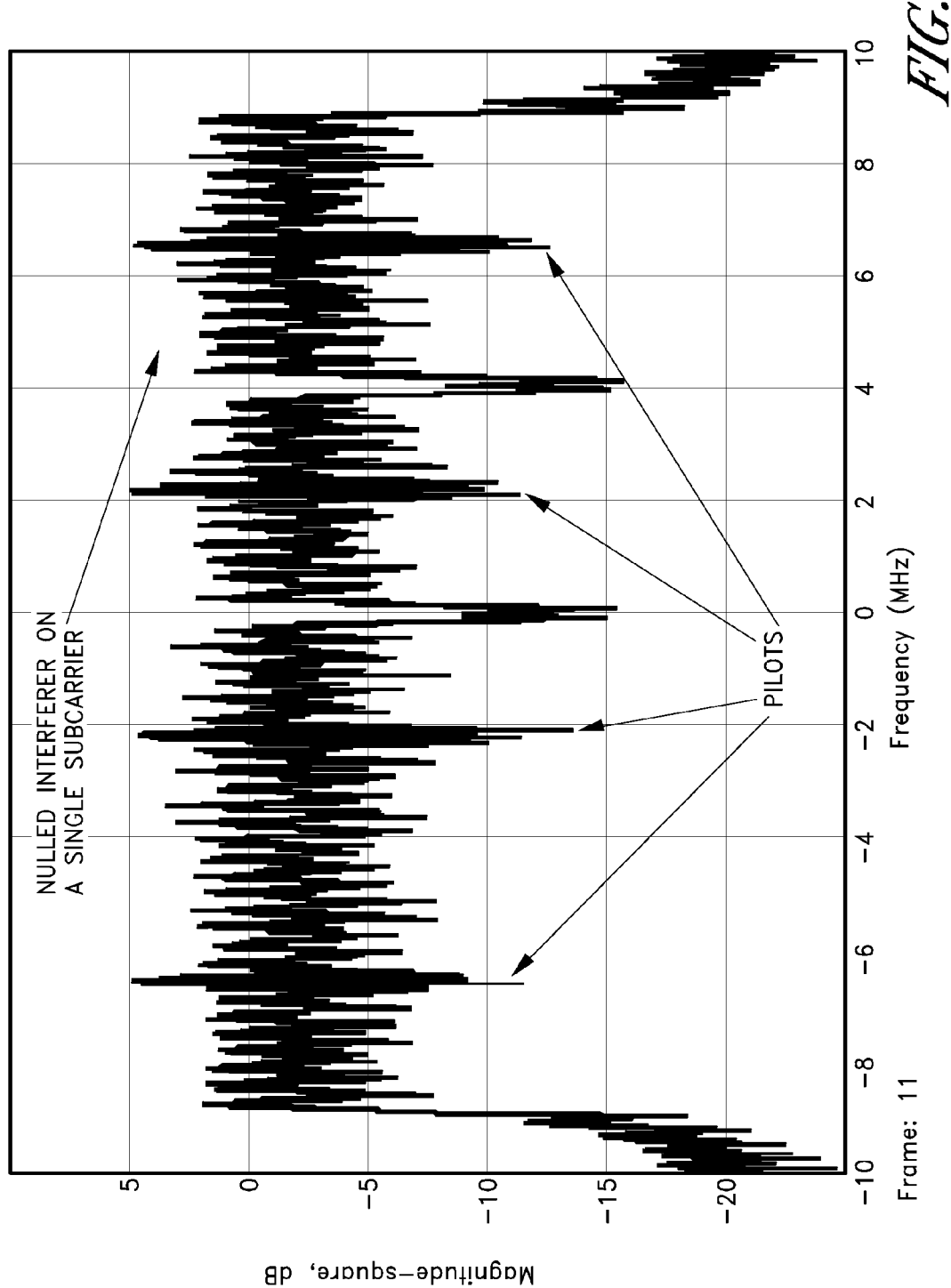
FIG. 6 illustrates the simulation of the signal spectrum with the obstructed subcarrier nulled.

FIG. 6 illustrates an example of a modified of signal spectrum (relative to FIG. 5) obtained by nulling the obstructed subcarrier at the receiver, prior to the Viterbi algorithm decoder and prior to the soft decision weight calculations. This is equivalent to the effect of an infinitely deep fade at the corrupted tone.

When the distorted tone is thus nulled, the SINR computation for the soft decision weight calculations properly includes the effect of interference in the nulled subcarrier. Thus, during Viterbi algorithm branch metric calculations, the Viterbi algorithm will reduce the weighting of bits that are affected by interference or fading and thereby improve its decoding performance. Although the illustrated embodiment is described using the equalizer output SINR to weight the Viterbi algorithm decoder soft decision branch metrics, it will be appreciated by those skilled in the art that other general measures of interference can be applied advantageously to perform the weighting in various situations without departing from the scope of the invention.

The narrowband interference signal can span more than just one subcarrier and the approach to dealing with such wider band interference is the same: the corrupted subcarriers are nulled and the modified signal used for further processing in the receiver. In some scenarios, for example, where a more precise characterization of the interference is available, those skilled in the art will recognize that it can be advantageous to attenuate partially rather than null completely the corrupted subcarriers before subsequent receiver processing, so this aspect of the description is not intended to be limiting in this sense. Indeed, embodiments of the invention include the use of various methods and techniques to modify and otherwise mark interference corrupted subcarrier data as less reliable for the purposes of soft decision weighting in the Viterbi algorithm.

Figure 7:
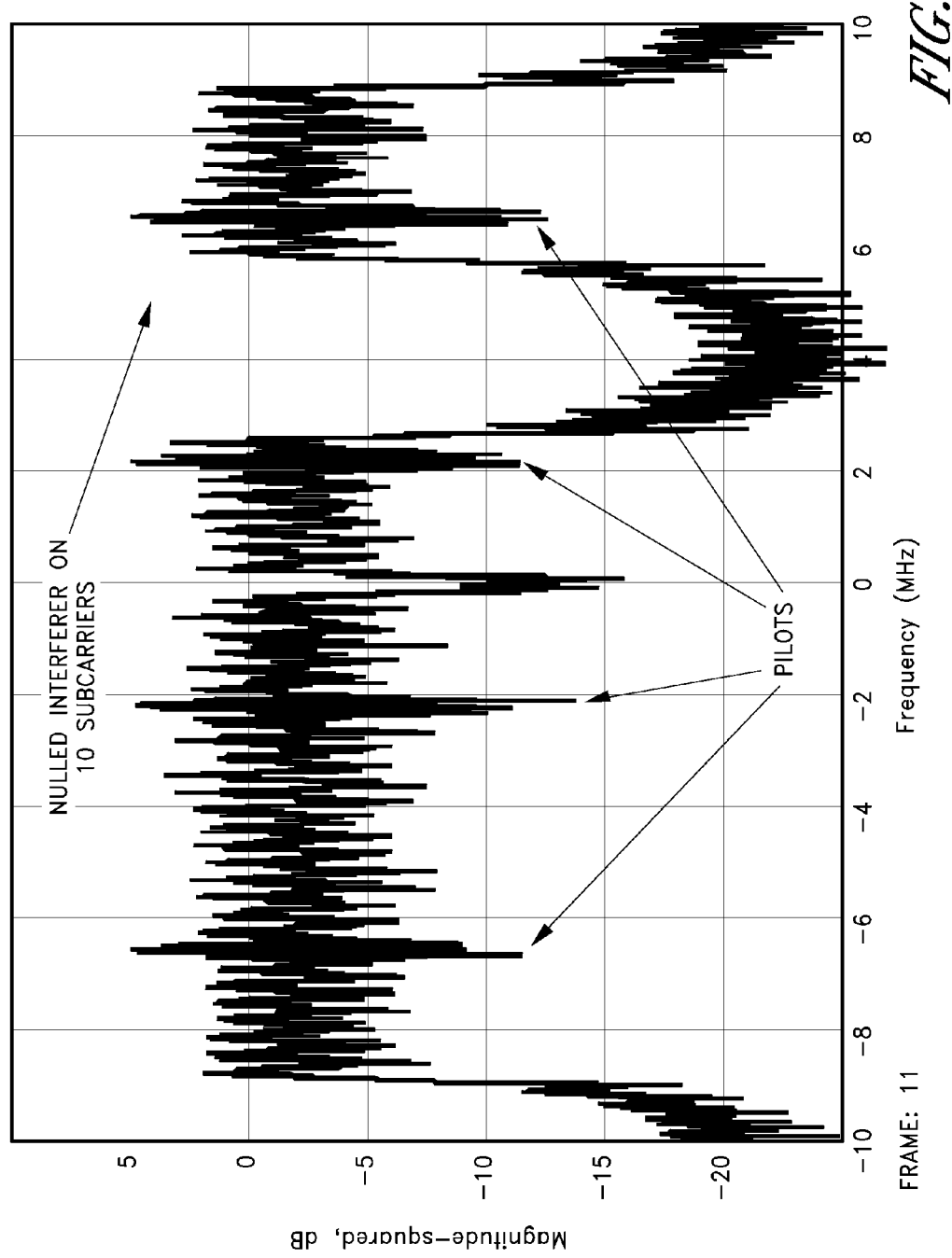
FIG. 7 illustrates a simulation of a signal spectrum with ten subcarriers nulled.

For the particular system described above, under the ideal, non-fading conditions in AWGN channel with 30 dB of SNR, 10 subcarriers can be removed and the Viterbi algorithm decoder should be able to decode the received data properly. An example of such a spectrum is presented in FIG. 7.

Figure 8:
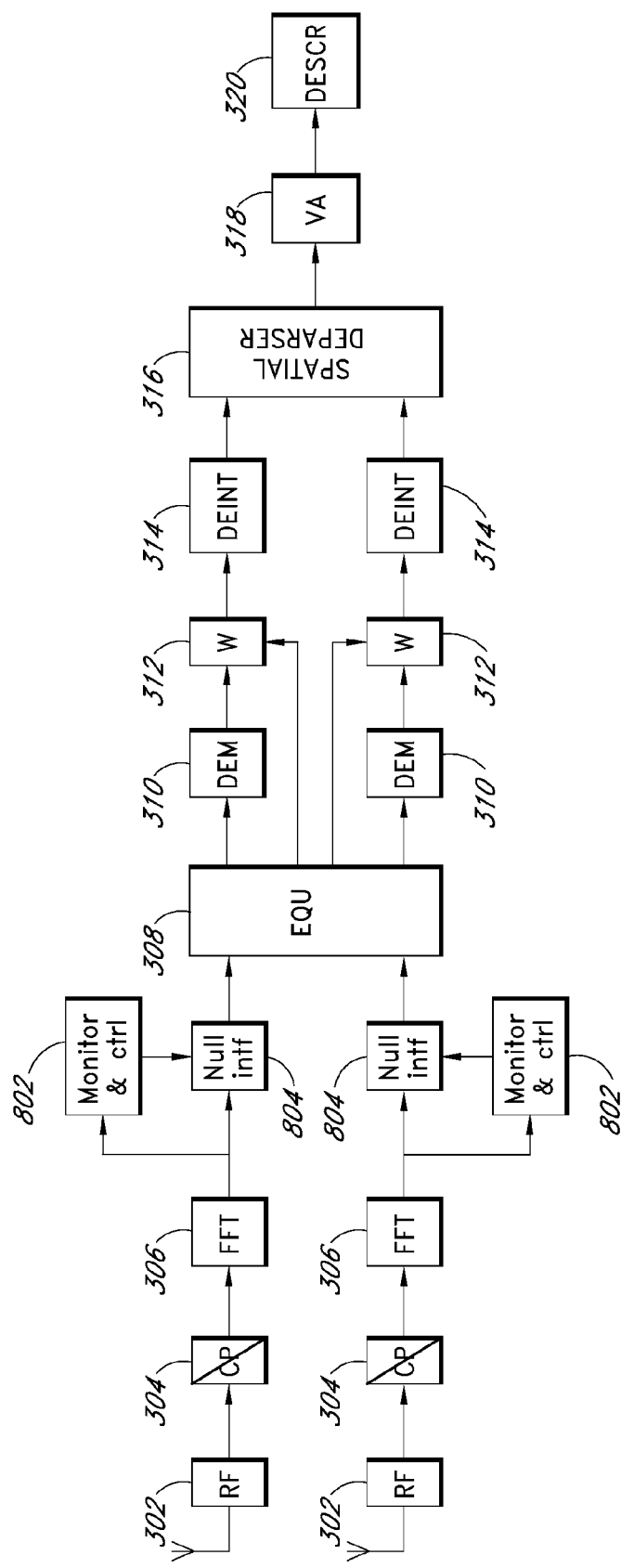
FIG. 8 illustrates an architecture of an OFDM receiver configured for interference erasure.

FIG. 8 illustrates an example of an architecture of an OFDM receiver configured for interference erasure. The illustrated embodiment is shown with two spatial processing paths for a wireless MIMO configuration. In a wired embodiment (not shown), there would typically be only one processing path.

The signals received at the antennas are passed through RF circuits 302, cyclic prefix removal 304, and FFT 306. In reception mode of the modem they are able to provide information about the detected signal energy even without the presence of the intended OFDM signal.

An FFT output is passed in parallel to a monitor and control circuit 802 and to an interferer removal circuit 804. One embodiment of the monitor and control circuit 802 detects the presence of an external interference signal in time slots when no signal should be present in the channel. In the simplest form, when a narrowband interferer exists within a number of subcarriers in the received signal, the monitoring circuitry of the monitor and control circuit 802 can be a simple subcarrier energy detector that directs the control circuitry of the monitor and control circuit 802 to null or otherwise attenuate the subcarriers during the reception of data. When activated by a control signal from the monitor and control circuit 802, the interferer removal circuit 804 suppresses (nulls or attenuates) the respective subcarrier. See, for example, FIG. 6 or 7. This advantageously changes the weighting applied by the soft demodulator block 310 for the data bits of the corrupted subcarriers. The data as a whole remains recoverable due to decoding of forward error correction codes, such as decoding of a convolutional code.

Other more complex types of interferers and hence monitor and control circuits 802 are possible. They can rely on interferer detection and its removal, so that the corrupted signal does not enter the processing chain.

After the interference suppression, the received signals are passed to the equalizer 308, which outputs the compensated received streams and estimates of the quality of those streams. Next, the equalized signal is forwarded to the soft demodulator circuit 310.

The weighting operation is done in the weighting circuit 312 and, weighted soft-decisions (W-SD) are delivered to the deinterleaver 314, deparsing circuit 316, Viterbi algorithm decoder 318 and finally to the descrambler 320.

In one embodiment, the circuits starting from the equalizer 308 are in wake-up mode only when used. In other words, the proper preamble should be detected before turning the whole receiver on. In order to detect the interferer, the receiver should be turned on in the absence of a received OFDM signal. This can be accomplished during the Interframe Slots (DIFS, EIFS, SIFS).

Figure 9:
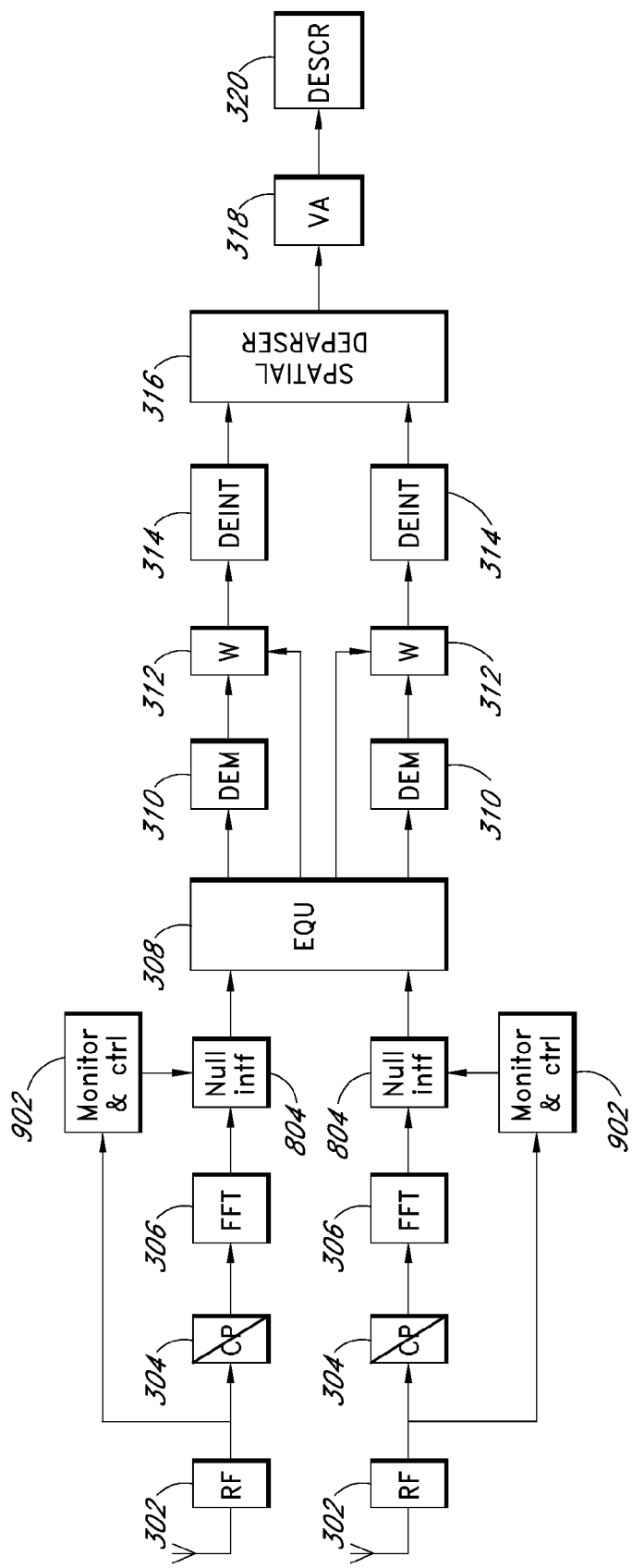
FIG. 9 illustrates one embodiment of the invention in which the signal monitoring block receives input from the RF output.

FIG. 9 illustrates one embodiment of the invention in which the signal monitoring circuit of a monitor and control circuit 902 receives an input from an output of the RF circuit 302.

The monitor and control circuit 902 of the embodiment presented in FIG. 9 may have its own baseband receiver that is able to detect various interferers. This implementation will typically be more expensive and complex to produce than that of FIG. 8, but it provides more flexibility and efficiency in detecting difficult to predict interferers, such as frequency hopping and intermittent signals etc., and not just simple continuous signals that are present on all or most parts of the packet duration.

Figure 10:
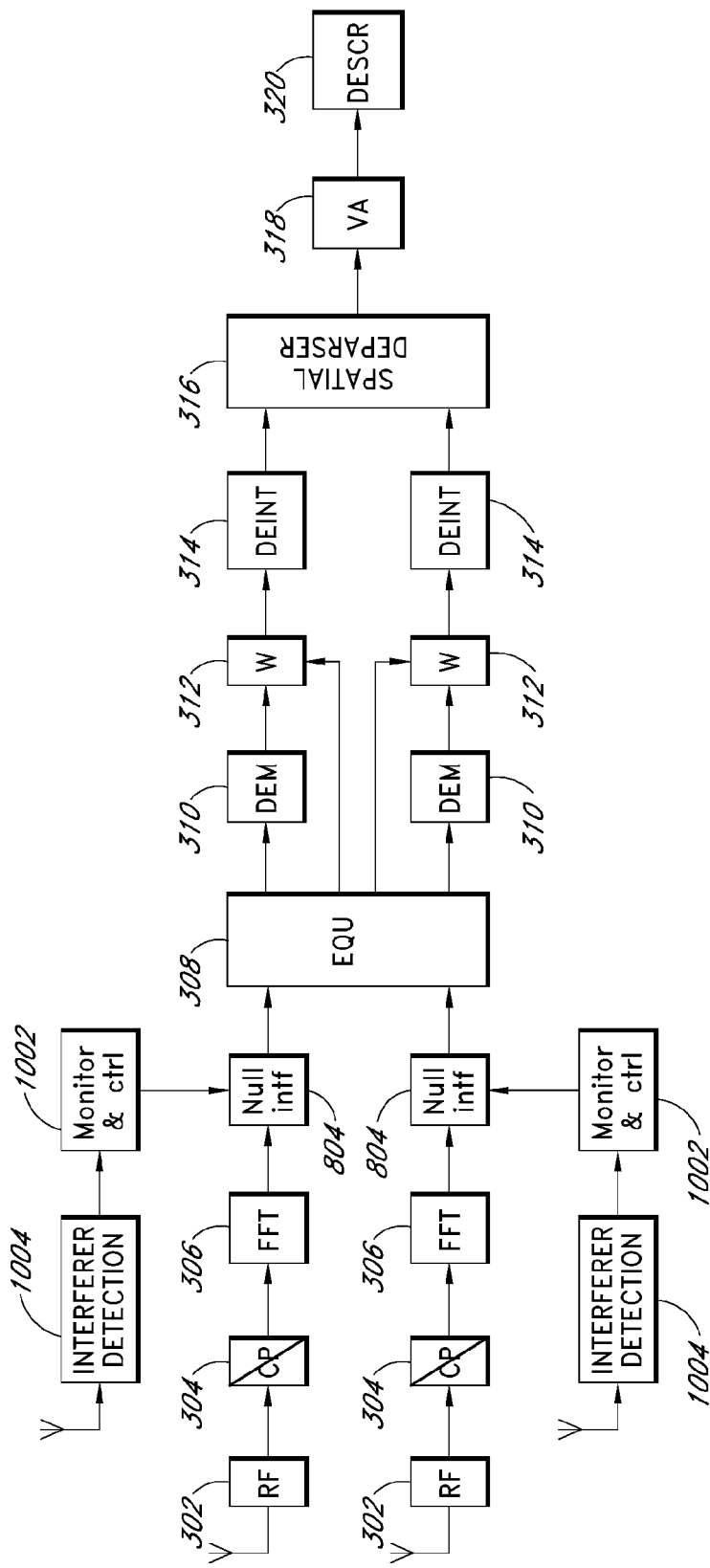
FIG. 10 illustrates one embodiment in which a signal monitoring block receives input from separate interferer RF detection circuitry.

FIG. 10 illustrates one embodiment in which a signal monitoring circuit of a monitor and control circuit 1002 receives an input from separate interferer RF detection circuitry 1004. The complexity of this solution is compensated by further increase in flexibility and efficiency in interference detection and removal.

Figure 11:
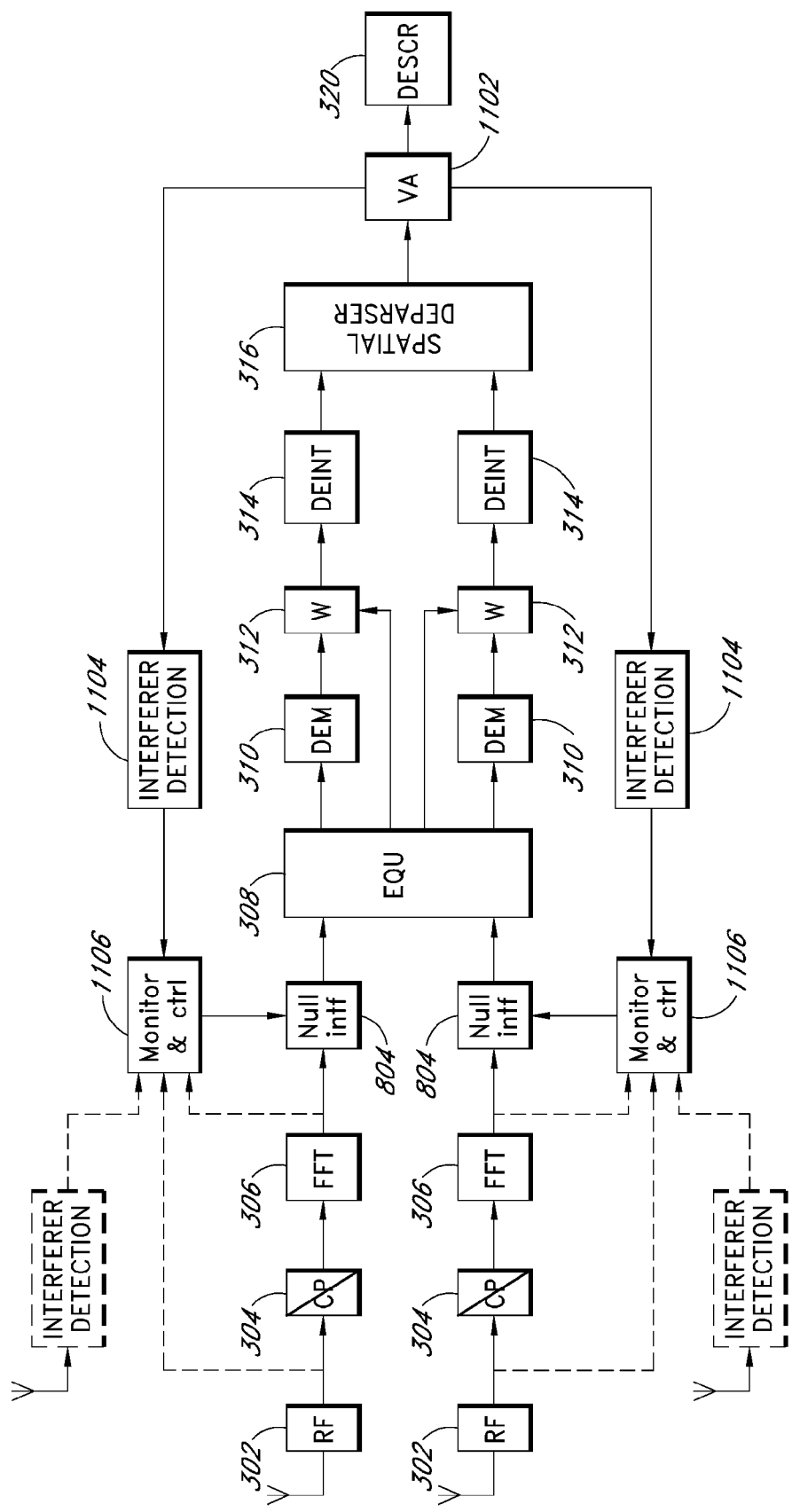
FIG. 11 shows yet another embodiment of the invention, where the Viterbi algorithm decoder is configured to feedback measures of subcarrier quality and reliability, as determined by factors including (but not limited to) the presence of interference.

FIG. 11 shows yet another embodiment of the invention, where the Viterbi algorithm decoder 1102 is configured to feedback measures of subcarrier quality and reliability, as determined by factors such as, but not limited to, the presence of interference as determined by an interferer detection circuit 1104. The feedback is provided to a monitor and control circuit 1106. Any of the previously described embodiments from FIG. 8, FIG. 9 or FIG. 10 may be combined with the additional information from the Viterbi algorithm decoder 1102 about the received signal as shown in FIG. 11 as indicated by the dashed lines and blocks.

For those skilled in the art, one well known signal quality measure from the Viterbi algorithm decoder 1102 is the actual branch metrics characterizing the error between the final chosen decoded path and each candidate path within the Viterbi algorithm decoder 1102, although the advanced embodiment of the invention shown in FIG. 11 is not limited to only this measure.

Figure 12:
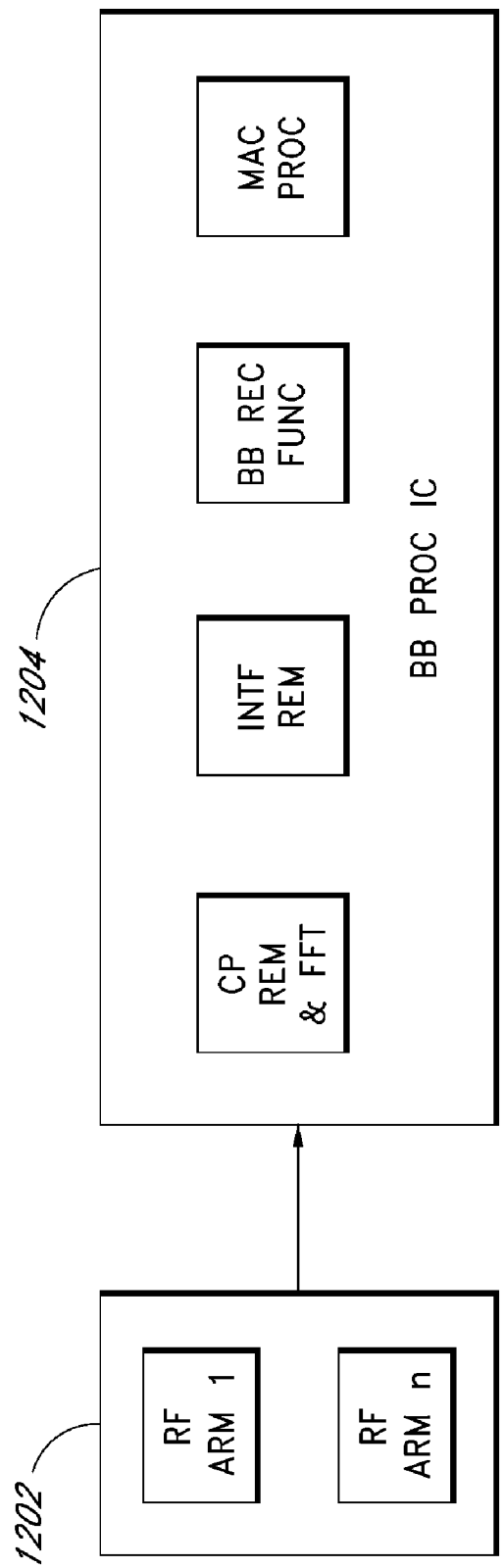
FIG. 12 illustrates one embodiment of the invention implemented in hardware.

FIG. 12 illustrates one embodiment of the invention implemented in hardware. The hardware can be implemented in a field programmable gate array (FPGA), a custom application specific integrated circuit (ASIC), or the like.

According to FIG. 12, the RF front end 1202 is a dual receiver that can process two signals received from two separate antennas. Baseband receiver functions are performed in a single integrated circuit 1204.

The disclosed techniques can be implemented by hardware, by software, or by a combination of both hardware and software. The RF circuits are implemented in hardware. In one application, some or all MAC layer functions are implemented in software or firmware. In an alternative embodiment, a DSP processor can be used to implement baseband functions of the wireless receiver. Those skilled in the art can easily incorporate an embodiment of the invention in different applications according to design requirements.

Various embodiments have been described above. Although described with reference to these specific embodiments, the descriptions are intended to be illustrative and are not intended to be limiting. Various modifications and applications may occur to those skilled in the art.

What is claimed is:

1. An apparatus for receiving an orthogonal frequency division multiplexing (OFDM) signal, the apparatus comprising:
   a Fourier transform processor configured to receive the OFDM signal and to generate a transformed output;
   a monitor and control circuit configured to detect when one or more subcarriers of the OFDM signal is obstructed by interference, and to generate a control signal based on such identification;
   an interferer removal circuit configured to receive the transformed output and to attenuate one or more subcarriers of the transformed output when activated by the control signal from the monitor and control circuit to generate a modified transformed output; and
   an equalizer configured to generate weights for decoding of a forward error correction code, wherein the equalizer is configured to receive the modified transformed output from the interferer removal circuit;
   wherein the interferer removal circuit is disposed in a signal path between the Fourier transform processor and the equalizer;
   wherein the interferer removal circuit is configured to cause the weights corresponding to the one or more obstructed subcarriers to be modified such that the weights are decreased when interference is detected.

2. The apparatus of claim 1, wherein the monitor and control circuit is operatively coupled to the equalizer to identify the one or more subcarriers for which interference is detected, and wherein the equalizer is configured to modify the generated weights for the identified one or more subcarriers.

3. The apparatus of claim 1, wherein the apparatus is embodied in a wireless receiver for a multiple-input-multiple-output (MIMO) system, further comprising:
   a plurality of processing paths configured to process respective spatial streams of subcarriers, wherein a first processing path of the plurality of processing paths comprises the Fourier transform processor, the monitor and control circuit, and the interferer removal circuit, wherein each processing path of one or more remaining ones of the plurality of processing paths comprises the same configuration as the first processing path, wherein the equalizer is operatively coupled to outputs of each of the interferer removal circuits of each of the plurality of processing paths;

wherein respective ones of the monitor and control circuits and interferer removal circuits are configured to cause the weights for the one or more obstructed subcarriers to be reduced for respective ones of the plurality of processing paths.

4. The apparatus of claim 1, wherein the monitor and control circuit is configured to detect when one or more subcarriers is obstructed by interference by detecting a presence of a signal during a time slot when no OFDM subcarrier signal should be present.

5. The apparatus of claim 4, wherein the monitor and control circuit is configured to monitor the transformed output of the Fourier transform processor.

6. The apparatus of claim 4, wherein the monitor and control circuit is configured to monitor an output of a receiver front-end.

7. The apparatus of claim 4, wherein the monitor and control circuit is coupled to a dedicated receiver front-end that is configured to detect interference.

8. The apparatus of claim 1, wherein the monitor and control circuit further comprises a baseband receiver configured to detect interferers.

9. The apparatus of claim 1, further comprising a Viterbi algorithm decoder configured to decode the forward error correction code, wherein the Viterbi algorithm decoder is further configured to feedback measures of subcarrier quality and reliability to the monitor and control circuit.

10. A method of receiving an orthogonal frequency division multiplexing (OFDM) signal, the method comprising:
generating, using a Fourier transform processor, a transformed output from the OFDM signal;
determining, using a monitor and control circuit, when one or more subcarriers of the OFDM signal is obstructed by interference, and generating a control signal based on such identification;
attenuating, using an interferer removal circuit, one or more subcarriers of the transformed output in response to the control signal from the monitor and control circuit to generate a modified transformed output;
receiving the modified transformed output in an equalizer;
generating, using the equalizer, weights for decoding of a forward error correction code such that weights associated with data of the one or more obstructed subcarriers are reduced based on the determination of interference;
wherein the interferer removal circuit is disposed in a signal path between the Fourier transform processor and the equalizer.

11. The method of claim 10, wherein the method is embodied in a wireless receiver for a multiple-input-multiple-output (MIMO) system, further comprising:
processing a plurality of spatial streams of subcarriers; and
reducing weights for the one or more obstructed subcarriers for each of the plurality of processing paths.

12. The method of claim 10, wherein determining when one or more subcarriers is obstructed by interference further comprises detecting a presence of a signal during a time slot when no OFDM subcarrier signal should be present.

13. The method of claim 10, further comprising a weighting circuit configured to apply the weights, wherein the weighting circuit is disposed in a signal path between an output of a soft decision demodulator and an input to a Viterbi algorithm decoder.

14. The method of claim 10, wherein determining further comprises using a baseband receiver of the monitor and control circuit to determine when one or more subcarriers of the OFDM signal is obstructed by interference.

15. The method of claim 10, further comprising decoding, using a Viterbi algorithm decoder, a forward error correction code, and feeding back measures of subcarrier quality and reliability from the Viterbi algorithm decoder to the monitor and control circuit.

16. The method of claim 10, further comprising applying the weights to a soft decision demodulator output prior to passing the output to a Viterbi algorithm decoder.

17. A method of receiving an orthogonal frequency division multiplexing (OFDM) signal, the method comprising:
generating, using a Fourier transform processor, a transformed output from the OFDM signal;
determining, using a monitor and control circuit, when one or more subcarriers of the OFDM signal is obstructed by interference, and generating a control signal based on such identification; and
attenuating, using an interferer removal circuit, one or more subcarriers of the transformed output in response to the control signal from the monitor and control circuit to generate a modified transformed output such that weights associated with data of the one or more obstructed subcarriers are reduced based on the determination of interference, wherein the interferer removal circuit is disposed in a signal path between the Fourier transform processor and an equalizer;
wherein the weights are reduced by modifying weights generated by the equalizer for the identified one or more subcarriers.

18. A method of receiving an orthogonal frequency division multiplexing (OFDM) signal, the method comprising:
generating, using a Fourier transform processor, a frequency domain output from the OFDM signal;
determining when one or more subcarriers of the OFDM signal is obstructed by interference by monitoring, using a monitor and control circuit, the frequency domain output of the Fourier transform processor and detecting a presence of a signal during a time slot when no OFDM subcarrier signal should be present, and generating a control signal based on such identification;
attenuating, using an interferer removal circuit, one or more subcarriers of the frequency domain output in response to the control signal from the monitor and control circuit to generate a modified frequency domain output; and
providing the modified frequency domain output as an input to an equalizer, which generates weights for decoding of a forward error correction code, such that weights associated with data of the one or more obstructed subcarriers are reduced based on the determination of interference;
wherein the interferer removal circuit is disposed in a signal path between the Fourier transform processor and the equalizer.

19. A method of receiving an orthogonal frequency division multiplexing (OFDM) signal, the method comprising:
generating, using a Fourier transform processor, a transformed output from the OFDM signal;
determining when one or more subcarriers of the OFDM signal is obstructed by interference by monitoring, using a monitor and control circuit, an output of a receiver front-end and detecting a presence of a signal during a time slot when no OFDM subcarrier signal should be present, and generating a control signal based on such identification;

attenuating, using an interferer removal circuit, one or more subcarriers of the transformed output in response to the control signal from the monitor and control circuit to generate a modified transformed output, wherein the interferer removal circuit is disposed in a signal path between the Fourier transform processor and an equalizer; and providing the modified transformed output as an input to the equalizer, which generates weights for decoding of a forward error correction code, such that weights associated with data of the one or more obstructed subcarriers are reduced based on the determination of interference.

20. A method of receiving an orthogonal frequency division multiplexing (OFDM) signal, the method comprising:

generating, using a Fourier transform processor, a transformed output from the OFDM signal;

determining when one or more subcarriers of the OFDM signal is obstructed by interference by monitoring, using a monitor and control circuit, an output of a dedicated receiver front-end that is configured to detect interference and detecting a presence of a signal during a time slot when no OFDM subcarrier signal should be present;

attenuating, using an interferer removal circuit, one or more subcarriers of the transformed output in response to a control signal from the monitor and control circuit to generate a modified transformed output; and providing the modified transformed output as an input to an equalizer, which generates weights for decoding of a forward error correction code, such that weights associated with data of the one or more obstructed subcarriers are reduced based on the determination of interference;

wherein the interferer removal circuit is disposed in a signal path between the Fourier transform processor and the equalizer.

* * * * *